A. COSFORD.
GRAIN MEASURER.
APPLICATION FILED SEPT. 14, 1911.
1,114,233.
Patented Oct. 20, 1914.
2 SHEETS—SHEET 1.
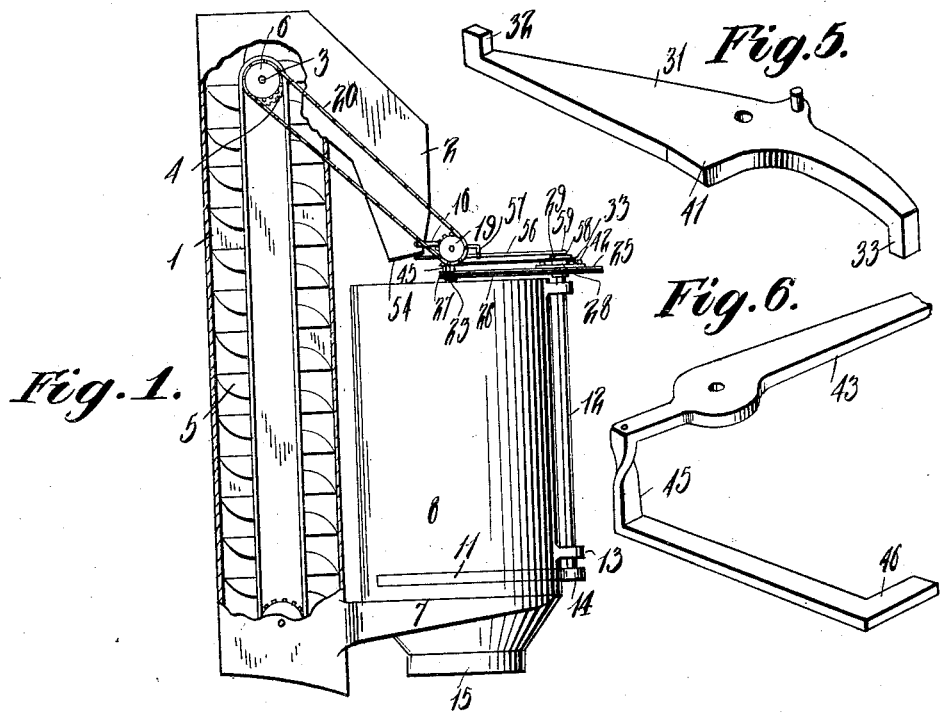
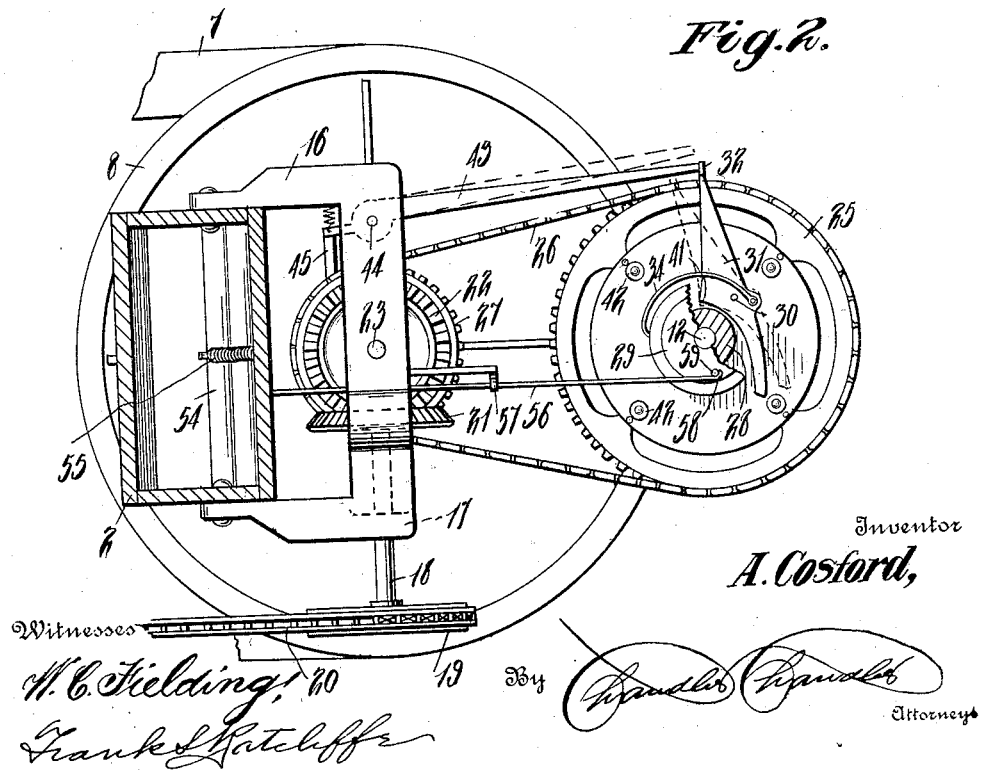
Inventor
A. Cosford,
Witnesses

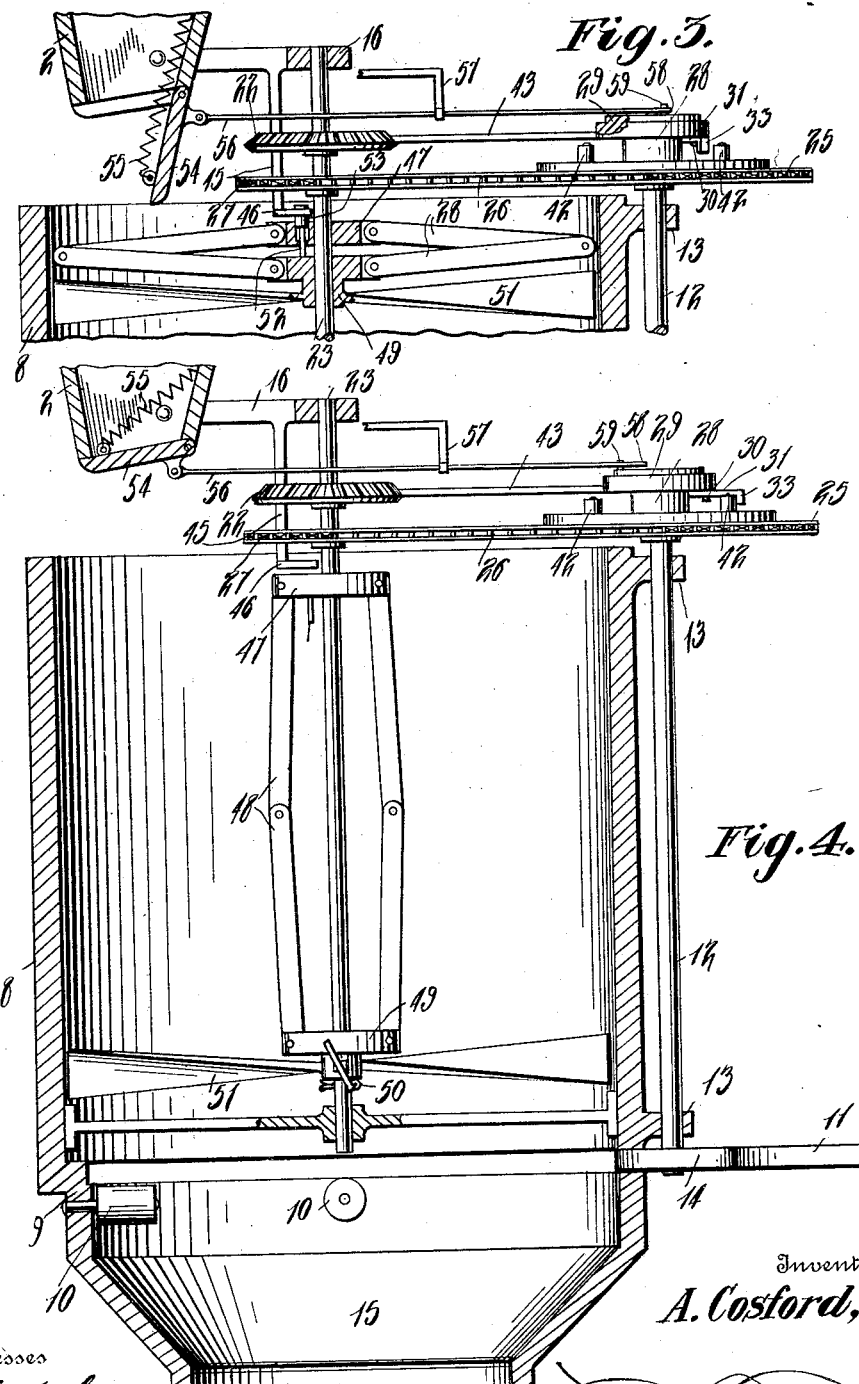

UNITED STATES PATENT OFFICE.

ALEXANDER COSFORD, OF OAK LAKE, MANITOBA, CANADA.

GRAIN-MEASURER.

1,114,233.

Specification of Letters Patent. Patented Oct. 20, 1914.

Application filed September 14, 1911. Serial No. 649,263.

*To all whom it may concern:*

Be it known that I, ALEXANDER COSFORD, a subject of the King of England, residing at Oak Lake, in the Province of Manitoba and Dominion of Canada, have invented certain new and useful Improvements in Grain-Measurers, of which the following is a specification.

My invention relates to grain measuring apparatus, and has for its leading object the provision of an improved apparatus adapted to receive grain as discharged from an endless conveyer and to hold said grain until a predetermined amount has been delivered by the conveyer and to then discharge said amount in a unitary quantity while automatically shutting off the discharge from the conveyer until the measuring receptacle is again in condition to receive the said discharge.

The further object of my invention is the provision of an improved means for opening the bottom of the measuring receptacle when the said receptacle has been filled and which means will be operated only when the receptacle is filled with the desired quantity and will be unaffected by variation in the speed of feeding of the grain or by differences in the weight, variety or size of the various grains measured by my apparatus.

Other objects and advantages of my improved grain measuring apparatus will be readily apparent by reference to the following description taken in connection with the accompanying drawings and it will be understood that I may make any modifications in the specific structure shown and described within the scope of my claims without departing from or exceeding the spirit of my invention.

Figure 1 is a side elevation of the improved measuring device associated with a conveyer chute, Fig. 2 is an enlarged top plan view of the measuring device, with the mechanism thereof shown with the bottom closed, and showing in dotted lines the initial movement for opening the bottom, Fig. 3 is a central vertical sectional view taken through the upper portion of the measuring device, with the parts in the relation assumed immediately prior to the opening of the bottom, Fig. 4 is a central vertical sectional view taken through the device, with the bottom shown in open position, Fig. 5 is a perspective view of the member for interlocking the motive means and the means for opening and closing the bottom and Fig. 6 is a perspective view of the trip lever for releasing the member shown in Fig. 5.

In the drawings, in which similar characters of reference are employed to denote corresponding parts throughout the several views, the numeral 1 designates the conveyer chute having the discharge portion 2 and having journaled in its upper end the shaft 3 for the sprockets 4 around which passes the endless carrier 5, said shaft 3 having secured on one projecting end thereof the sprocket 6.

Secured to the conveyer 1 are the bracket arms 7 projecting outwardly from the chute and serving to support the cylindrical measuring tank or chamber 8 having the depending L-shaped plate 9 supporting the rollers 10 on which rides the disk 11 forming the bottom of the chamber 8. A shaft 12 is rotatably secured to the outer face of the chamber 8 and has its lower end journally extending through the bracket 13 and secured to the projecting ear 14 of the disk 11, rotation of the shaft 12 moving the disk to open the bottom of the chamber and allow the same to discharge into the funnel shaped receiving member 15 which is supported by the conveyer casing and is adapted to discharge into any suitable receptacle.

Secured to the discharge end 2 of the chute 1 is the rectangular bracket member 16 having a bearing 17 in which is rotatably supported the shaft 18 having at its outer end a sprocket 19 connected by the chain 20 with the sprocket 6 of the conveyer shaft, said shaft 18 having on its other end the miter gear 21 in mesh with the miter gear 22 secured on the vertical shaft 23 which is rotatably supported by and depends from the bracket 16 and has its lower end extending downward into the measuring chamber 8.

Secured to the outer edge of the chamber 8 is the bearing 24 through which projects the upper end of the shaft 12, while rotatably mounted on the projecting end of the shaft 12 is a sprocket 25 connected by the sprocket chains 26 with the sprocket 27 secured on the shaft 23 to rotate with said shaft, the rotation of the sprocket 27 driving the sprocket 25. Secured on the upper end of the shaft 12 above the sprocket 25 is the head portion 28 having the flanged upper rim 29 to the under side of which is pivoted on the pin 30 the lever 31 having an upwardly projecting outer end flange 32 and a depending inner end flange 33. A spring 34 has one end secured to the flange rim 29 and the other end bearing against the pin 40 which projects from the lever 31, this spring serving to throw the downwardly projecting flange 33 outward and the movement of the lever as impelled by the spring being limited by the bearing of the shoulder 41 of the lever against the shaft 12. The sprocket 25 has projecting upward therefrom a plurality of rollers 42 which are adapted to engage the end 33 of the lever to cause the lever and thus the wheel or collar 28 and shaft 12 to rotate with the sprocket. To normally lock the lever and thus the shaft against rotation, I employ the lever 43 which is pivoted at 44 to the bracket 16 and has the depending portion 45 extending downward into the receptacles and terminating in an arm 46 disposed adjacent the shaft. The shaft has secured thereon and disposed within the chamber 8 the sleeve 47 to which are pivoted the upper ends of the jointed levers 48 having their lower ends pivoted to the sleeve 49 which is slidably mounted on the shaft and has its downward movement limited by the cotter 50 passing through the lower end of the shaft 23. Said sleeve 49 has secured to its periphery the fan like member 51 having its vanes so inclined as to ride upward on the grain in the chamber 8 as the shaft 23 is rotated by the gear 21. This rising of the fan member 51 shoves the sleeve 49 upward against the sleeve 47 as the chamber is filled. Said sleeve 47 has depending therethrough the reduced lower end 52 of the pin 53 having its upper end adapted to bear against the arm 46. As the sleeve 49 rises it shoves the pin 53 upward to strike the arm 46 and thus to rock the lever 43 against the tension of the spring 54 having one end secured to the bracket 16 and the other end secured to the lever. This outward swinging of the lever 43 causes the same to release the end of the lever 31 and the spring 34 shifts the lever 31 into position where one of the rollers 42 engages the lever and forces the lever and thus the shaft 12 and bottom 11 to rotate with the sprocket 25, the rotation of the bottom permitting the contents of the chamber to be discharged therefrom. The bottom will be given a complete rotation, when, the grain having fallen out and allowed the sleeve 49 to descend, the spring 34 will have thrown the lever 43 inward to cause the same to contact with the lever 31 as the lever is brought around by the sprocket and this contact will move the end of the lever out of engagement with the roller 42. The sprocket 25 will then loosely rotate on the shaft 12 while the lever 43 holds the lever 41 and thus the shaft 12 and the bottom 11 against movement until the block 49 is again raised to strike the pin 53 and shift the lever 43.

To prevent grain from being discharged from the end 2 of the conveyer when the bottom of the measuring chamber is open, I hinge to the end 2 the door 54' forced into closed position by the spring 55 having one end secured within the conveyer chute and the other end secured to the door or gate 54'. Said door or gate 54' is normally held open by the rod 56 which is pivoted to the door and extends through the guide 57 and terminates in a hooked end 58 resting against the upper face of the flange 29. Said flange has a pin 59 projecting upward therefrom engaging the hook 58, the position of said parts being such that as soon as the shaft 12 begins to rotate the pin will move out of engagement with the end of the rod to allow the spring to close the door, while as the bottom 11 of the chamber 8 is almost closed the pin 59 will engage the hooked end 58 and will draw on the rod to open the grain controlling door 54 as is clearly illustrated in the drawings.

From the foregoing description taken in connection with the accompanying drawings, the construction and operation of my improved automatic grain measuring apparatus will be readily apparent and it will be seen that I have provided an improved apparatus in which the filling of the measuring chamber will serve to both automatically shut off the flow into the said chamber and to operate means for causing the discharge of the contents of the chamber and also that the emptying of the chamber will again throw into operation means for causing the chamber to be again closed and the filling chute opened to allow grain to again enter the chamber, all of said operations being automatic and occurring successively as the chamber is filled and emptied so long as the conveyer runs.

It is consequently evident that I have provided an extremely satisfactory and efficient apparatus for measuring grain as the same is discharged from a conveyer or carrier which will commend itself to all as highly desirable.

I claim:

1. The combination with a chute having a discharge end, of an endless carrier movable in the chute, a receptacle disposed beneath the discharge end of the chute, a removable bottom for the receptacle, a float rotatable in the receptacle to ride on the top of the grain when rotated, connections between the carrier and the float for rotating the float as the carrier moves, and means operated by the rising of the float to a predetermined position for shutting off the flow of grain and temporarily removing the bottom of the receptacle to discharge the grain therefrom.

2. The combination with a chute having a discharge portion, of an endless carrier movable in the chute, a receptacle disposed below the discharge portion of the chute, a shaft around which the carrier passes, a bracket secured to the chute, a shaft depending from the bracket into the receptacle, connections between the carrier shaft and the depending shaft for driving the latter, a block secured on the shaft, a second block slidable on the shaft, jointed levers having their ends pivoted to the blocks to connect the same, a fan member secured to the sliding block and adapted to ride on the grain to raise said block when the parts are rotated, and mechanism connected to the shaft and actuated by the rising of the block for shutting off the flow of grain from the discharge portion of the chute and for causing the discharge of the grain from the receptacle.

3. An automatic grain measuring device, comprising a receptacle, means for discharging grain into the receptacle, mechanism disposed within the receptacle and raised by the discharge of the grain into the receptacle, a rotatable bottom for the receptacle, a rotating sprocket, and means actuated by the rising of the mechanism within the receptacle for connecting the sprocket to the bottom to cause the rotation of the bottom to discharge the grain from the receptacle.

In testimony whereof, I affix my signature, in the presence of two witnesses.

ALEXANDER COSFORD.

WILLIAM COELMANE,
EARLE G. THOMLINSON.

Copies of this patent may be obtained for five cents each, by addressing the "Commissioner of Patents, Washington, D. C."